United States Patent [19]

Suzuki et al.

[11] Patent Number: 5,154,739

[45] Date of Patent: Oct. 13, 1992

[54] SOLVENT RECOVERY TREATMENT METHOD

[75] Inventors: Yoshinori Suzuki; Sadao Kumazawa, both of Kanagawa, Japan

[73] Assignee: Fuji Photo Film Co., Ltd., Kanagawa, Japan

[21] Appl. No.: 701,908

[22] Filed: May 17, 1991

[30] Foreign Application Priority Data

Jun. 21, 1990 [JP] Japan .................. 2-161439

[51] Int. Cl.⁵ ............................................. B01D 53/04
[52] U.S. Cl. ............................................ 55/74; 55/28; 55/59
[58] Field of Search ............... 55/25, 26, 28, 59, 62, 55/68, 71, 74

[56] References Cited

U.S. PATENT DOCUMENTS

| | | | |
|---|---|---|---|
| 4,020,117 | 4/1977 | Sisson | 55/74 X |
| 4,104,039 | 8/1978 | Kuri et al. | 55/25 X |
| 4,203,734 | 5/1980 | Winter et al. | 55/26 |
| 4,305,734 | 12/1981 | McGill | 55/62 X |
| 4,398,927 | 8/1983 | Asher et al. | 55/74 X |
| 4,409,006 | 10/1983 | Mattia | 55/28 |
| 4,414,003 | 11/1983 | Blaudszun | 55/28 X |
| 4,421,532 | 12/1983 | Sacchetti et al. | 55/28 |
| 4,522,637 | 6/1985 | Becker | 55/25 |
| 4,738,694 | 4/1988 | Godino et al. | 55/59 |
| 4,812,147 | 3/1989 | BeVier | 55/62 X |
| 4,842,621 | 6/1989 | Robbins et al. | 55/26 |
| 4,846,852 | 7/1989 | Schweitzer et al. | 55/62 X |
| 4,859,216 | 8/1989 | Fritsch | 55/28 |
| 4,919,692 | 4/1990 | Vara et al. | 55/59 |

Primary Examiner—Robert Spitzer
Attorney, Agent, or Firm—Sughrue, Mion, Zinn, Macpeak & Seas

[57] ABSTRACT

A solvent recovery treatment method of adsorbing at least two kinds of solvent-gas containing gases different in solvent content concentration, wherein: a rarefied solvent-gas containing gas is first passed through a first adsorbing device; the rarefied gas passed through the first device is switched to be passed through the second adsorbing device after a predetermined time has elapsed while a dense solvent-gas containing gas begins to be passed through the first adsorbing device; the rarefied gas passed through the second device is switched to be passed through a third adsorbing device after the predetermined time while the dense gas passed through the first device is switched to be passed through the second absorbing device, and the first adsorbing device is made to perform regenerating operation. The above operations are successively repeated according to necessity. By this method, the adsorbing faculty of an adsorbing agent can be utilized fully, and the equipment rate of the adsorbing device and the adsorbing agent regeneration cost per unit solvent treatment can be reduced.

2 Claims, 5 Drawing Sheets

QUANTITY OF ADSORPTION 0.05kg/kg · ADSORBING AGENT

FIG. 3B(1)
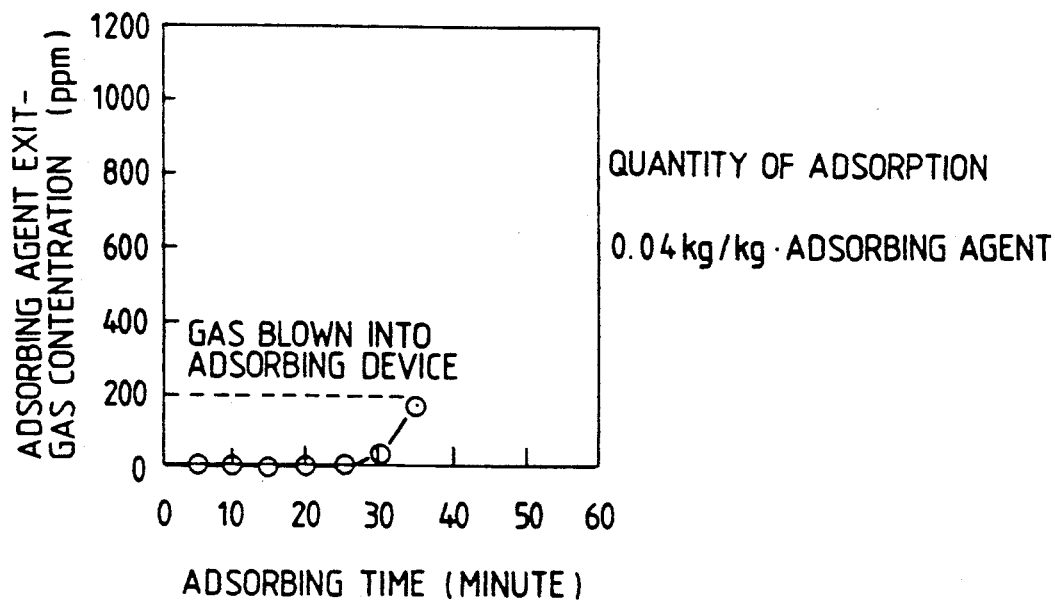
FIG. 3B(2)
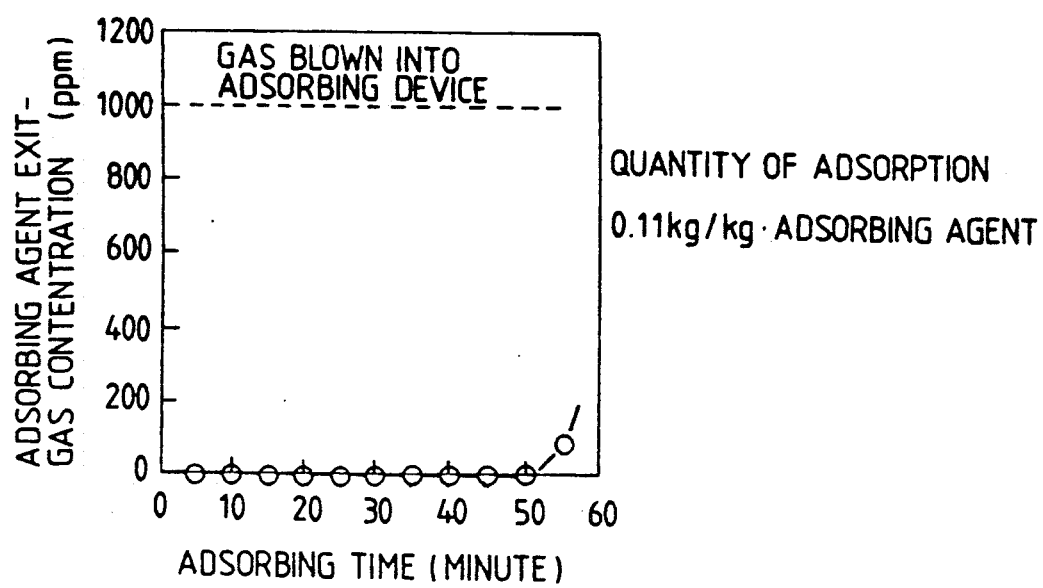

SOLVENT RECOVERY TREATMENT METHOD

BACKGROUND OF THE INVENTION

1. Field of the Invention

The present invention relates to a solvent recovery treatment method for recovering an evaporated solvent by using an adsorbing agent in a filming process, a coating process, etc. using an organic solvent in a chemical factory.

2. Description of the Related Art

Examples of a process producing at least two or more kinds of solvent-gas containing gases which are different in gas concentration include a filming process, a coating process, etc. As a solvent recovery method for treating a solvent produced in those processes, there has been a method in which, as shown in FIG. 2A, solvent-gas containing gases from a rarefied solvent gas producing source 1 and a dense solvent gas producing source 2 are respectively cooled in coolers 3 and 4, mixed by blowers 5 and 7, and then fed to an adsorbing device 9b, so that the solvent of the mixture is adsorbed by an adsorbing agent 10b while the gases of the mixture are discharged. Alternatively, the gases of the mixture may be circulated by blowers 6 and 8 through filters 14 and 15 respectively so as to be used again. On the other hand, in this method, a heat regeneration gas 11 is fed to an adsorbing device 9a so that the solvent adsorbed in the adsorbing agent 10a is released from the adsorbing agent 10a, and then the thus released solvent is condensed in a condenser 12 so as to be recovered into a solvent storing tank 13. The adsorbing devices 9a and 9b are made to continuously alternately adsorbing and releasing recovery by switching respective valves 16.

Besides, there has been another recovery treatment method in which, as shown in FIG. 3A, an adsorbing device for a rarefied solvent gas producing source 1 and another adsorbing device for a dense solvent gas producing source 2 are provided separately to thereby adsorb and release a gas of a single solvent gas concentration in the same manner as in FIG. 2.

In FIG. 3A, where reference numbers found also in FIG. 2A denote elements analogous to those of FIG. 2A, a rarefied solvent gas producing source 1 and a dense solvent gas producing source 2 are respectively cooled in coolers 3 and 4, mixed by blowers 5 and 7, and then fed to a first adsorbing device 9a and a third adsorbing device 9c. Thereby the solvent of the mixture is adsorbed by first and third adsorbing agents 10a and 10c, respectively, while the gases of the mixture are discharged. Alternatively, the gases of the mixture may be circulated by blowers 6 and 8 through filters 14 and 15, respectively, so as to be used again. In this method, a heat regeneration gas 11 is concurrently fed to second adsorbing device 9b and a fourth adsorbing device 9d, so that the solvent adsorbed in the second and fourth adsorbing agents 10b and 10d is released therefrom. The thereby released solvent is condensed in first and second condensers 12a and 12b, respectively, so as to be recovered into first and second solvent storing tanks 13a and 13b, respectively. By switching valves, the first adsorbing device 9a is made to continuously alternate adsorbing and releasing recovery processes with the second adsorbing device 9b. Similarly, the third adsorbing device 9c continuously alternates adsorbing and releasing recovery processes with the fourth adsorbing device 9d.

However, in the method shown in FIG. 2A, the adsorbing faculty of an adsorbing agent is reduced because of mixing a dense gas and a rarefied gas. Otherwise, in the method shown in FIG. 3A, because of providing two pairs of adsorbing devices, the equipment rate has been high, and the regeneration cost per unit solvent treatment has been increased. The cost per unit solvent treatment increases with the frequency with which regeneration is performed. Therefore, as explained with reference to FIGS. 3B(1) and 3B(2) hereinafter, use of the arrangement shown in FIG. 3A is not cost-efficient, because the adsorption efficiency of the rarefied gas is less in comparison with that of the dense gas, resulting in shortened regeneration cycles.

SUMMARY OF THE INVENTION

It is therefore an object of the present invention to solve the foregoing problems in the prior art.

It is another object of the present invention to provide a method of solvent recovery treatment by which the adsorbing faculty of an adsorbing agent can be utilized fully, and the equipment rate of the adsorbing device and the adsorbing agent regeneration cost per unit solvent treatment can be reduced.

The foregoing objects of the present invention are attained by the solvent recovery treatment method of adsorbing at least two kinds of solvent-gas containing gases different in solvent content concentration, wherein: a rarefied solvent-gas containing gas is first passed through a first adsorbing device; the first adsorbing device is switched over to a second adsorbing device so that the rarefied solvent-gas containing gas is blown into the second adsorbing device after passage of the rarefied solvent-gas containing gas through the first adsorbing device for a predetermined time and before an adsorbing agent in the first adsorbing device begins breakthrough, and at the same time a dense solvent-gas containing gas is passed through the first adsorbing device; the first adsorbing device is switched over to the second adsorbing device so that the dense solvent-gas containing gas is blown into the second adsorbing device after the passage of the dense solvent-gas containing gas through the first adsorbing device for the predetermined time and before the adsorbing agent in the first adsorbing device begins breakthrough, and at the same time the second adsorbing device is switched over to a third adsorbing device so that the rarefied solvent-gas containing gas is passed through said third adsorbing device; the first adsorbing device is made to perform regenerating operation; and above operations are successively repeated.

Preferably, the solvent-gas content concentration of the dense solvent-gas containing gas at the time when the dense solvent-gas containing gas is led into each adsorbing device is adjusted so as to be three times or more as high as that of the rarefied solvent-gas containing gas.

In the present invention, the adsorption and treatment of at least two kinds of solvent-gas containing gases different in solvent content concentration mainly means that the solvent gas generating source is separated into two or more parts.

In the present invention, as the solvent-gas containing gas, an $N_2$ gas or the like is used in the case where the solvent has an explosive or ignitable property, while air is used in general cases.

In the present invention, as each adsorbing devices, it is intended to include a fixed-bed and a rotary cylindrical adsorbing/releasing device. Activated carbon is used as the adsorbing agent. In the case of the fixed-bed, therefore, used are fixed-beds corresponding in number to the first, second and third adsorbing devices in the above expression, but in the case of the rotary cylindrical adsorbing/releasing device, only one device may include the first, second and third adsorbing sections.

The present invention has a feature in that the solvent-gas content concentration of the dense solvent-gas containing gas at the time when the dense solvent-gas containing gas is led into each adsorbing device is adjusted so as to be three times or more as high as that of the rarefied solvent-gas containing gas, so that the quantity of the solvent adsorbed by the adsorbing agent can be increased, thereby reducing the equipment rate and the regeneration cost per unit adsorbing agent.

BRIEF DESCRIPTION OF THE DRAWINGS

FIG. 3B(1) is a diagram showing the relationship between the adsorbing time and the adsorbing agent exit gas concentration with respect to the rarefied gas concentration; and FIG. 3B(2) is a diagram showing the relationship between the adsorbing time and the adsorbing agent exit gas concentration with respect to the dense gas concentration.

DETAILED DESCRIPTION OF THE PREFERRED EMBODIMENT

Figure 1A:
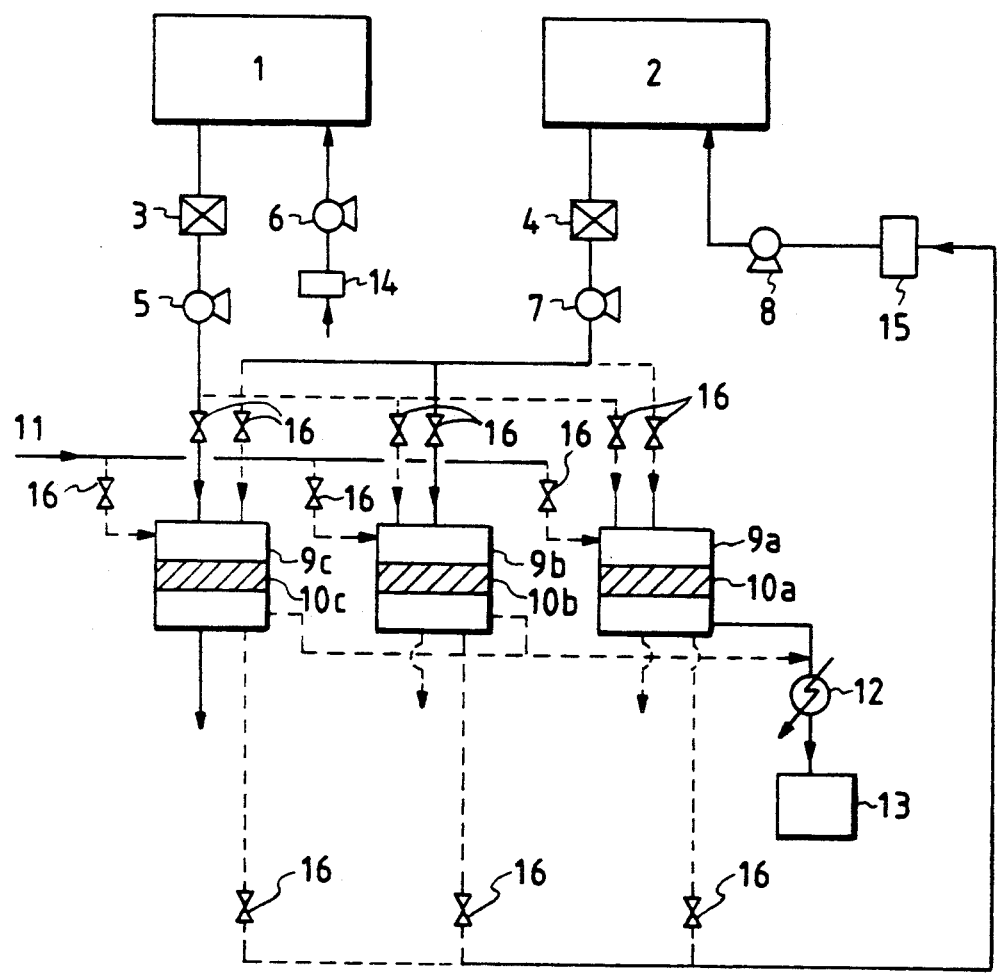
FIG. 1A is a flow diagram showing an embodiment of an apparatus for the solvent recovery treatment method according to the present invention.

An embodiment of the present invention will be described with reference to FIG. 1. In FIG. 1A, there are provided a rarefied solvent gas producing source 1, a dense solvent gas producing source 2, a first adsorbing device 9a, a second adsorbing device 9b and a third adsorbing device 9c. Pipe paths for connecting those adsorbing devices 9a, 9b and 9c to the solvent gas producing sources 1 and 2 are arranged so as to be switchable by valves 16.

After a predetermined time has passed from the start of passage of a rarefied solvent-gas containing gas from the rarefied solvent gas producing source 1 through the first adsorbing device 9a and before an adsorbing agent 10a in the first adsorbing device 9a begins breakthrough, the first adsorbing device 9a is switched over to the second adsorbing device 9b so that the rarefied solvent-gas containing gas is blown into the second adsorbing device 9b, and at the same time a dense solvent-gas containing gas from the dense solvent gas producing source 2 is passed through the first adsorbing device 9a. After the above predetermined time has passed from the start of passage of the dense solvent-gas containing gas from the dense solvent gas producing source 2 through the first adsorbing device 9a and before the adsorbing agent in the first adsorbing device 9a begins breakthrough, the first adsorbing device 9a is switched over to the second adsorbing device 9b so that the dense solvent-gas containing gas is blown into the second adsorbing device 9b, and at the same time the second adsorbing device 9b is switched over to the third adsorbing device 9c so that the rarefied solvent-gas containing gas is passed through the third adsorbing device 9c. The above-mentioned predetermined time is decided on the basis of shorter one of the respective absorption breakthrough start times of the rarefied and dense solvent gases. FIG. 1A shows a state where the first adsorbing device 9a has been shifted to its regenerating operation.

That is, the air from the rarefied solvent gas producing source 1 is cooled by a cooler 3, and brought into the third adsorbing device 9c by a blower 5, so that its solvent gas is adsorbed by an adsorbing agent 10c. Although the gas after the adsorption is being discharged, the solvent is not included therein.

Then, air to be supplied to the producing source is blown by a blower 6 through a filter 14.

The solvent-gas containing gas from the dense solvent gas producing source 2 is passed through a cooler 4 and fed by a blower 7 to the second adsorbing device 9b having adsorbed the rarefied solvent gas, so that most of its solvent is adsorbed by an adsorbing agent 10b. Since the solvent concentration is more or less existing at the exit, the discharged gas is blown by a blower 8 through a filter 15 in order to be re-used by the dense solvent gas producing source 2. At that time, the gas concentration of the solvent-gas containing gas from the dense solvent-gas producing source 2 is adjusted so as to be three times or more as high as that of the rarefied solvent-gas containing gas, by the blowing quantity of the blowers 7 and 8.

The first adsorbing device 9a is performing regeneration after adsorbing the dense-gas concentration gas following the absorption of the rarefied solvent gas concentration gas. A heat regeneration gas 11 is blown into the first adsorbing device 9a so that the solvent adsorbed in the adsorbing agent 10a is evaporated into the heat regeneration gas, cooled and condensed by a condenser 12 so as to be recovered in the liquid phase, and then stored in a solvent storing tank 13.

According to the solvent recovery treatment method of the present invention, it is possible to fully utilize the adsorbing faculty of an adsorbing agent, and reduce the equipment rate of the adsorbing device and the regeneration cost. In addition, by adjusting the concentration of dense solvent gas at the exit of the adsorbing device to three times or more as high as that of the rarefied solvent gas concentration, it is possible to increase the adsorbing rate of the adsorbing agent.

EXAMPLES

Example 1

Figure 1B:
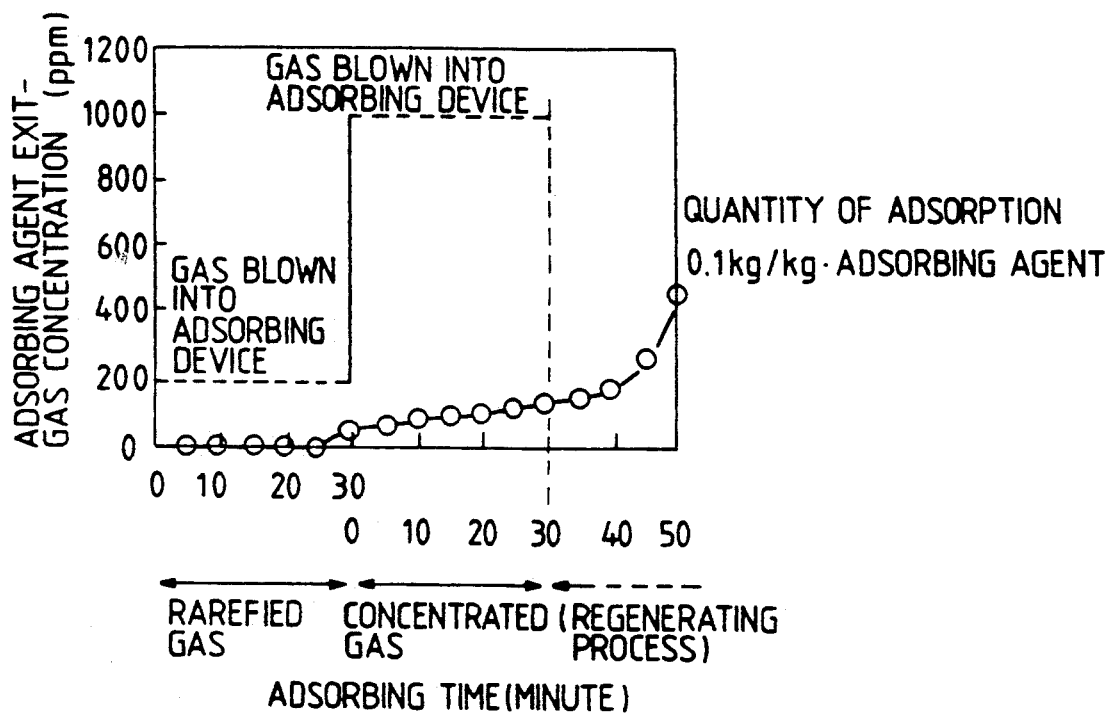
FIG. 1B is a diagram showing the relationship between the adsorbing time and the adsorbing agent exit concentration.
Figure 2A:
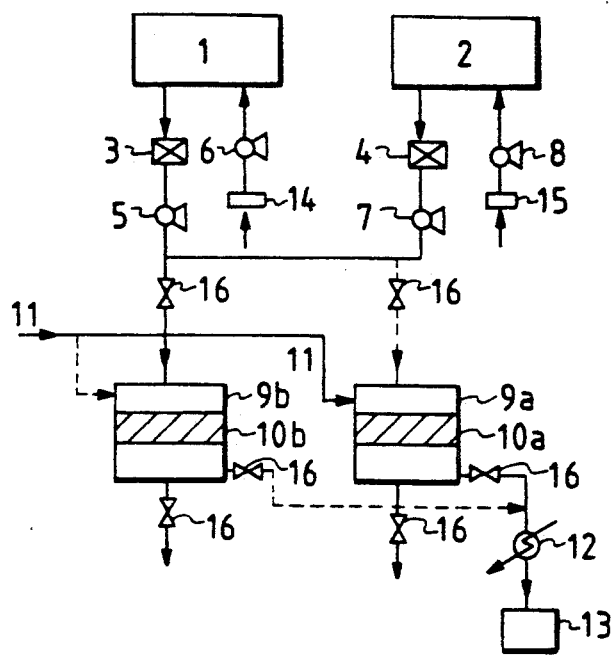
FIG. 2A is a flow diagram showing an example of an apparatus for a solvent recovery treatment method according to the prior art.
Figure 2B:
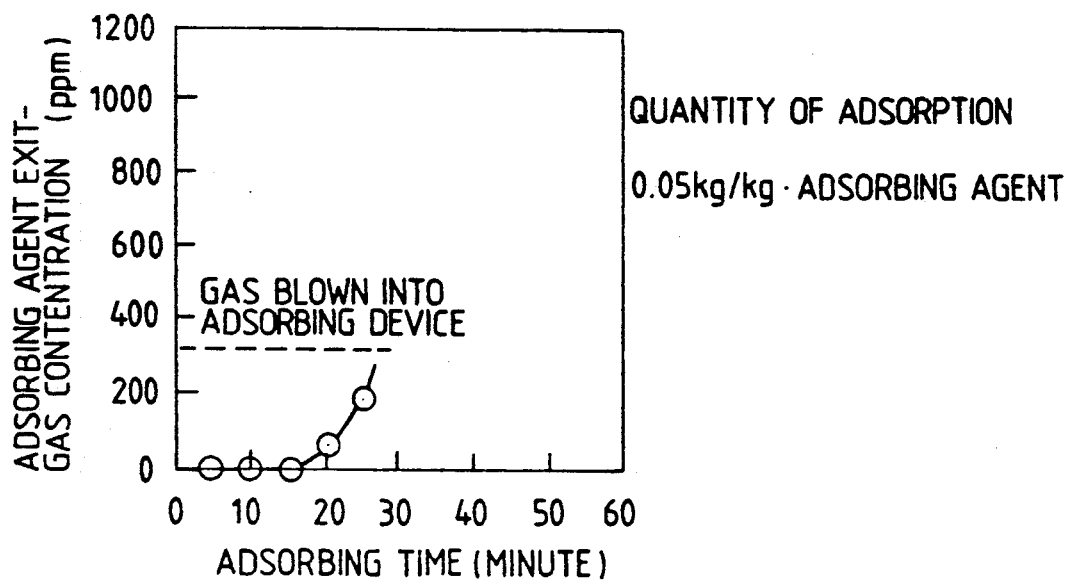
FIG. 2B is a diagram showing the relationship between the adsorbing time and the adsorbing agent exit gas concentration.
Figure 3A:
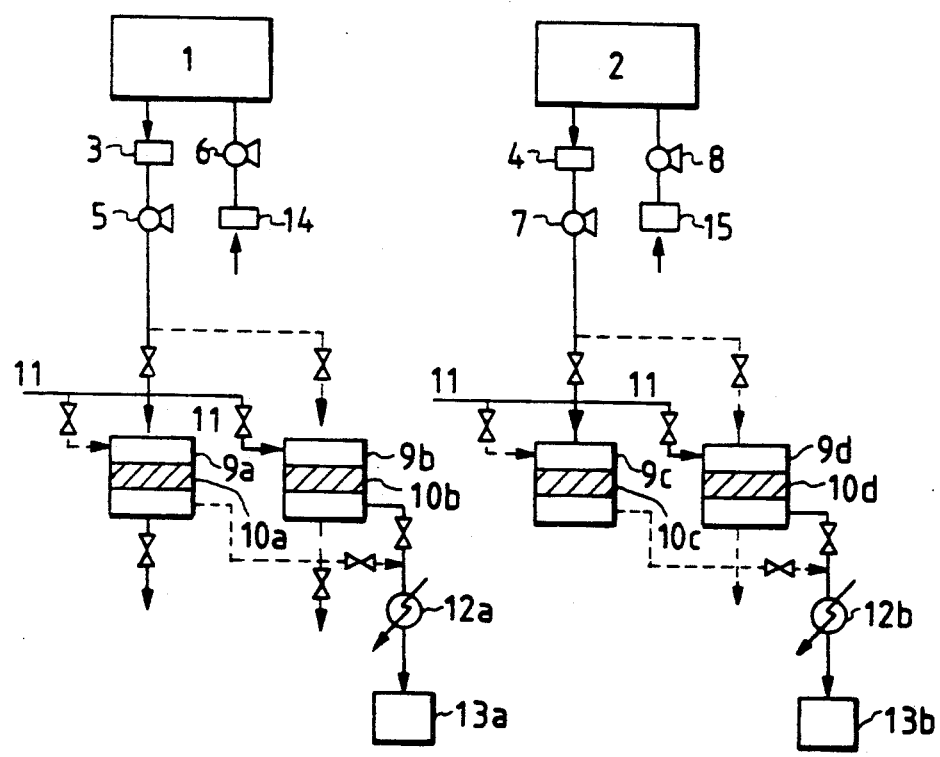
FIG. 3A is a flow diagram showing another example of an apparatus for the solvent recovery treatment method according to the prior art.

By use of the apparatus according to the present invention as shown in FIG. 1A, a rarefied solvent-gas containing gas (methylene chloride 200 ppm) was passed at 4 m³/min through an adsorbing device, and then a dense solvent-gas containing gas (methylene chloride 1000 ppm) was passed at 1 m³/min through the same adsorbing device to thereby perform adsorbing treatment. At this time, the quantity of adsorption of the methylene chloride by activated carbon was 0.1 kg per 1 kg of the activated carbon (adsorbing time before the beginning of the rarefied gas breakthrough was 30 min, and 30 min also in the case of the dense gas) as shown in FIG. 1B. On the other hand, as shown in FIG. 2B, the quantity of adsorption of the methylene chloride by the activated carbon was 0.05 Kg per 1 kg of the activated carbon in the case of adsorbing gas of the mixture of the rarefied and dense gases by the method as shown in FIG. 2A (adsorbing time was 20 min before the beginning of the breakthrough). By the method as shown in FIG. 3A, the quantity of adsorption of the methylene chloride in the rarefied-gas containing gas by the activated carbon was 0.04 Kg per 1 kg of the activated carbon (adsorbing time was 30 min before the beginning of the rarefied gas breakthrough) as shown in FIG. 3B(1). The quantity of adsorption of the methylene chloride in the dense-gas containing gas by active carbon was 0.11 Kg per 1 kg of the activated carbon (adsorbing time was 50 min before the beginning of the rarefied gas breakthrough) as shown in FIG. 3B(2).

From this, it is understood that the quantity of adsorption of the methylene chloride by active carbon per 1 kg thereof becomes so much more as the solvent gas concentration of containing gas blown into adsorbing device is higher.

In addition, through studying the energy at the time of releasing the solvent from the activated carbon in which the gas has been adsorbed as mentioned above, it has been found that it suffices to regenerate the active carbon at every 30 min according to the present invention, while the active carbon has to be regenerated every 15 min in the method of FIG. 2A, and in the method in FIG. 3, the active carbon has to be regenerated at every 30 min for the rarefied gas and at every 50 min for the dense gas, that is, consequently, at every 19 min as a whole, so that the energy required for the regeneration is also consumed in proportion to the number of times of the regeneration.

Example 2

Figure 1C:
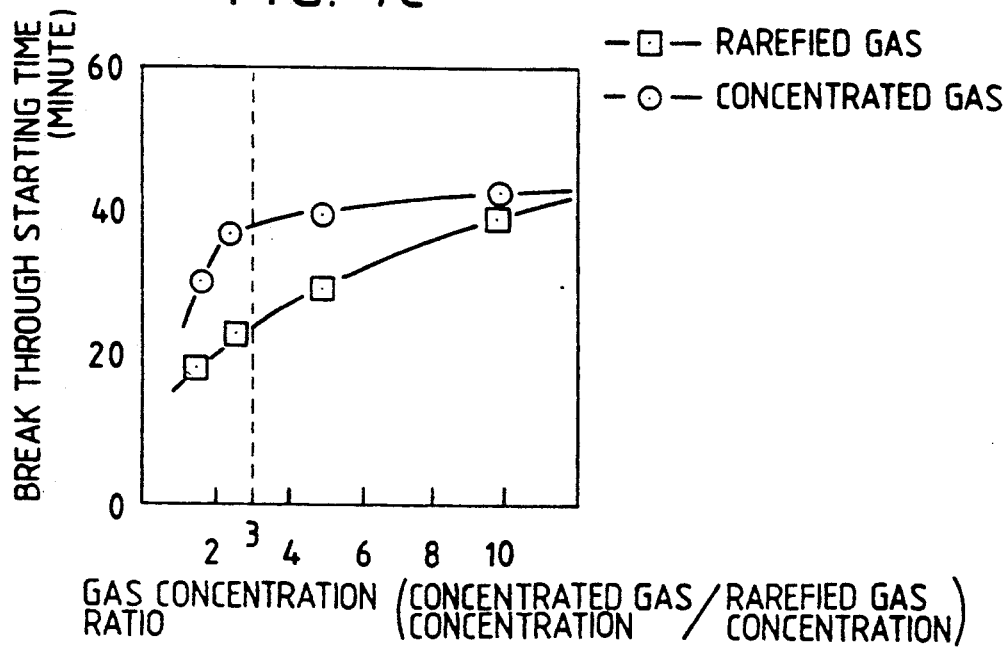
FIG. 1C is a diagram showing the relationship between the gas concentration ratio and the breakthrough starting time.

As shown in FIG. 1C, through looking into the relationship between the ratio of dense gas concentration to rarefied gas concentration and the breakthrough starting time, it has been understood that satisfactory effect according to the present invention can be obtained if the gas concentration ratio is not less than three.

Conditions of Examinations

The concentration of dense-gas containing gas: methylene chloride 1000 ppm;

Adsorbed gas linear speed: rarefied gas 0.2 m/sec; dense gas 0.05 m/sec;

Activated carbon layer thickness: 25 cm

Performing Manner

By switching the rarefied gas into the dense gas as soon as the rarefied gas starts breakthrough, respective breakthrough start times were obtained.

As apparent from the examples of the present invention, according to the present invention, it was possible to fully utilize the adsorbing faculty of an adsorbing agent, and reduce the equipment rate of adsorbing device and the regeneration cost of the adsorbing agent per unit solvent treatment.

What is claimed is:

1. A solvent recovery treatment method of adsorbing at least two kinds of solvent-gas containing gases different in solvent content concentration, wherein:

a rarefied solvent-gas containing gas is first passed through a first adsorbing device;

the first adsorbing device is switched over to a second adsorbing device so that the rarefied solvent-gas containing gas is blown into said second adsorbing device after passage of the rarefied solvent-gas containing gas through said first adsorbing device for a predetermined time and before an adsorbing agent in said first adsorbing device begins breakthrough, and at the same time a dense solvent-gas containing gas is passing through said first adsorbing device;

said first adsorbing device is switched over to said second adsorbing device so that the dense solvent-gas containing gas is blown into said second adsorbing device after the passage of the dense solvent-gas containing gas through said first adsorbing device for said predetermined time and before the adsorbing agent in said first adsorbing device begins breakthrough, and at the same time the second adsorbing device is switched over to a third adsorbing device so that the rarefied solvent-gas containing gas is passed through said third adsorbing device;

said first adsorbing device is made to perform regenerating operation; and above operations are successively repeated;

and wherein the solvent-gas content concentration of the dense solvent-gas containing gas at the time when the dense solvent-gas containing gas is led into each of said adsorbing devices is adjusted so as to be three times or more as high as that of the rarefied solvent-gas containing gas.

2. A solvent recovery treatment method according to claim 1, wherein a discharged gas, resulting from said dense solvent-gas containing gas being passed through at least one of said adsorbing devices, is recirculated so as to be combined with said dense solvent-gas containing gas.

* * * * *